Nov. 16, 1926.
H. G. TORULF
1,606,852
APPARATUS FOR CHARGING CIRCULAR SINTERING PANS
Filed Sept. 19, 1925    2 Sheets-Sheet 1
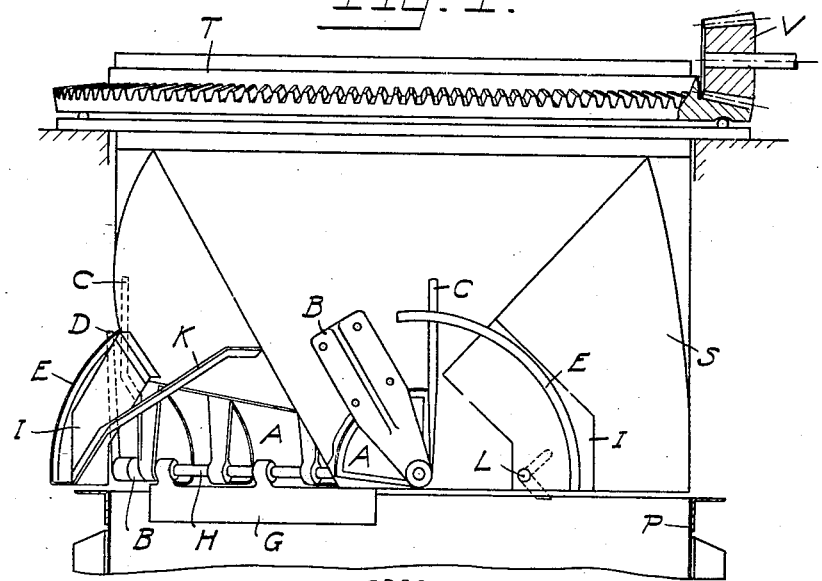
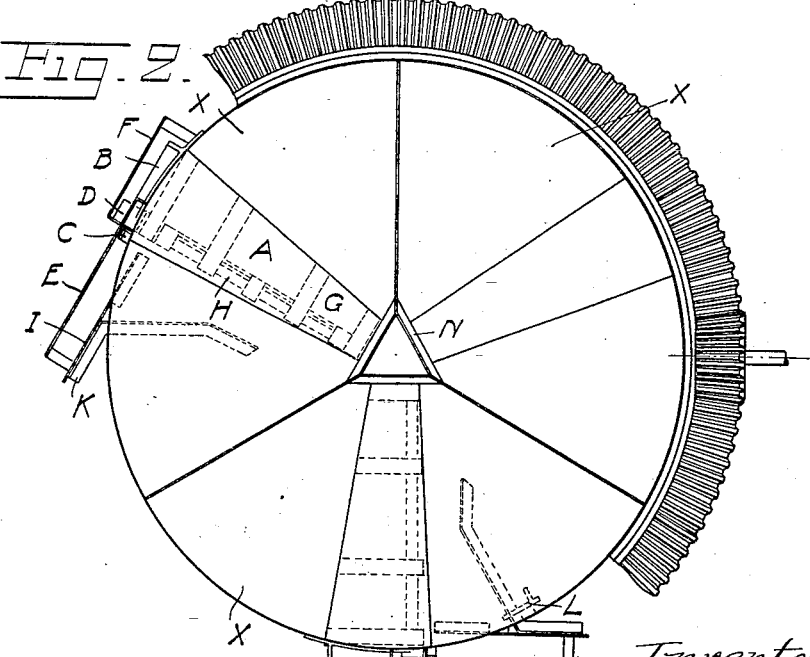

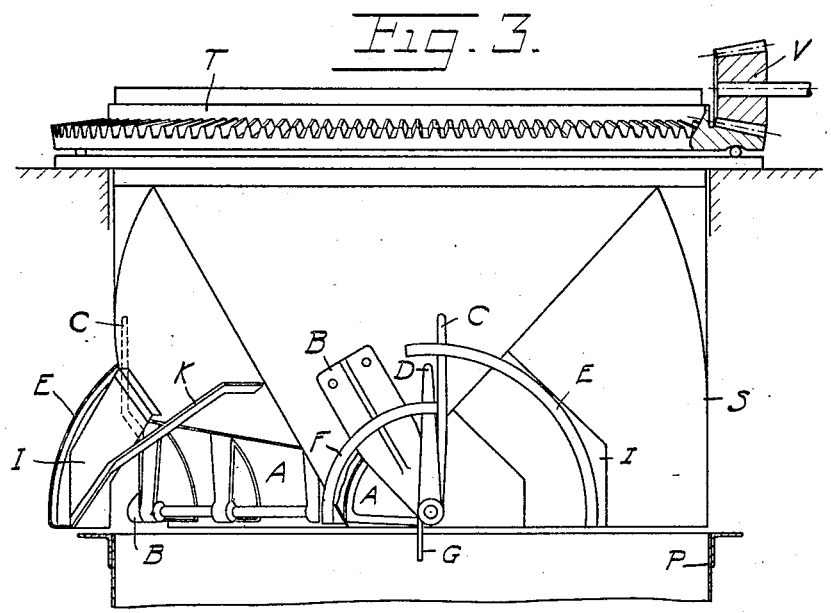

Patented Nov. 16, 1926.

1,606,852

UNITED STATES PATENT OFFICE.

HELGE GUSTAF TORULF, OF STOCKHOLM, SWEDEN.

APPARATUS FOR CHARGING CIRCULAR SINTERING PANS.

Application filed September 19, 1925. Serial No. 57,340, and in Sweden September 24, 1924.

This invention relates to an improved apparatus for charging circular sintering pans.

The charging of circular pans for sintering of fine ores mixed with pulverulent fuel was hitherto generally performed by hand which method requires long practice and great skill of the workmen for securing such even and uniformly tight charge that the combustion of the fuel in the charge progresses uniformly through it.

The chief object of the invention is to avoid the troublesome handiwork in charging circular sintering pans and to make it possible to use mechanical means for charging such pans in a rapid and easy manner with one or several layers of charging material, which in the latter case can be of different composition or be of different nature.

The apparatus according to this invention comprises a pocket-like container below which the pan to be charged is placed, the pan and the container being rotatable in relation to each other about a vertical axis, the pan having in the bottom a substantially radial charging slot the width of which decreases from the periphery of the apparatus towards its centre and can be varied by means of an adjustable shutter.

When the apparatus is charging a circular pan is placed above the latter and the charging apparatus and the pan are rotated in relation to each other while the shutter is open the charge material is, on account of the width of the charging slot decreasing towards the centre, delivered to the pan in such quantity along the length of the slot that the pan obtains a layer of charging material which everywhere is of uniform thickness. The smoothing and packing of the charge material can be effected during the rotation of the charging apparatus or of the pan by means of the lower edge of the shutter, or a separate radial and adjustable smoothing plate can be provided in combination with the shutter for such purpose. When the charging apparatus is provided with several pockets one of them can be used for charging the pan with coarse material adapted to cover the grate of the pan while the other pockets when more than two pockets are provided may be used for charging the pan with pulverulent ore containing different percentages of fuel and, if desired, to place above the ore a thin layer of unmixed fuel.

In the accompanying drawings I have shown one embodiment of the invention. Fig. 1 shows an elevation of a charging apparatus according to this invention, Fig. 2 is a plan thereof and Fig. 3 shows another elevation of the apparatus after a rotation of 120° from the position shown in Fig. 1.

Referring now to the drawings, P is the upper portion of a sintering pan to be charged which in a well-known manner has the shape of an upright flat circular cylinder. S is the charging apparatus which is used for effecting the charging of the pan and which can be stationary in which case the pans to be charged are placed closely below it, or the charging apparatus may be portable in which case it is placed above the pan to be charged and after the performing of the charging is removed or carried away to another empty pan. In the embodiment shown the charging apparatus is supported at its upper portion on a horizontal thrust roller bearing T the upper thrust ring of which is connected to the charging apparatus and formed as or rigidly connected to a toothed ring which is engaged by a pinion V by means of which the charging apparatus is rotated during the charging operation. For the thrust bearing T a journalling at the lower portion of the charging apparatus may be substituted, for instance by means of wheels which roll directly on the upper flange of the pan. Said modification is to be preferred when the charging apparatus is portable.

The charging apparatus comprises in the embodiment shown three pockets X which at the top plan are sector-shaped each comprising an angle of 120° so that they together form a full circle. The pockets have outer vertical walls which form portions of a vertical circular cylinder the diameter of which is about equal to the diameter of the pans to be charged, and oblique side walls of such great inclination that the material has no tendency to stick in the pockets. In the bottom of each pocket a charging opening is provided, said opening being normally closed by a rotatable shutter A the mantle surface of which has the form of a sector of a cone and which is journalled in such manner, that the charging opening is successively opened when the shutter is rotated and in doing this always maintains the form of a slot decreasing in width from the periphery towards the centre. By this means a uniform charging over the whole horizontal cross-section of the pan is secured when the shutter is opened and the charging apparatus is rotated in relation to the pan placed below it. The shutter A is rotatable on a shaft H the outer end of which is journalled in a bearing B secured to the outer wall of the pocket and the inner end of which is journalled in a prismatic centre piece N which is formed by the inner walls of the pockets. The rotation of the shutter A is effected by means of a handle C secured thereto. The handle C can be locked to a locking quadrant E in different positions said quadrant being carried by a plate I which is secured to the pocket and stayed by an angle iron K. At one or more of the pockets the shaft H preferably also carries a regulating and smoothing plate G by means of which the material supplied to the pan is levelled and smoothed. When such plate G is provided the shaft H is provided with a handle D by means of which the shaft and the plate may be rotated so that the latter can be adjusted in a vertical or oblique position or horizontally at will, the plate being in the latter case out of operation. For effecting a somewhat greater compression of the charge at the periphery of the pan than at the centre and thus prevent the combustion air from taking its way to a too great extent along the wall of the pan, a compression device consisting of a plate or the like L secured in oblique position to the angle iron H or other suitable part behind the shutter A is preferably provided. It is sufficient to have such a compression device at the pocket which contains the charge material for the uppermost layer in the pan.

The operation of the apparatus above described is easily understood from the foregoing description and is briefly stated as follows, it being supposed that the charging shall take place with three layers of different composition placed above each other. The three pockets are filled with the different charging materials whereupon the shutter at the pocket containing material for the bottom layer is opened and the charging apparatus at the same time is rotated. The said charging material is thus distributed in a layer of equal thickness on the bottom of the pan. Then the shutter is closed and the rotation of the charging apparatus is stopped. The operation is then repeated with the other pockets in a similar manner and the opening of the shutters is so adjusted that the pan is filled when the third layer has been supplied to it.

It is, of course, not necessary that the charging apparatus be rotatable as it may be rigidly supported if the pan to be charged is placed on a rotatable bearing and is rotated during the charging inasmuch as it is only necessary for securing a uniform charge to rotate the charging apparatus and the pan in relation to each other.

What I claim is:—

1. Apparatus for charging circular sintering pans, comprising a pocket-like container below which the pan to be charged is placed, said container having in the bottom a substantially radial slot the width of which decreases from the periphery towards the centre of the apparatus, an adjustable shutter adapted to vary the width of said slot, a substantially radial plate below the shutter for leveling the material delivered from the container to the pan and means for imparting to said container and pan a relative rotation.

2. Apparatus for charging circular sintering pans, comprising a container composed of a plurality of sector-like pockets below which the pan to be charged is placed, each pocket having in its bottom a substantially radial slot the width of which decreases from the periphery towards the centre, adjustable shutters adapted to vary the width of said slots, and means for imparting to said container and pan a relative rotation.

3. Apparatus for charging circular sintering pans, comprising a pocket-like container below which the pan to be charged is placed, said container having in its bottom a substantially radial slot the width of which decreases from the periphery towards the centre of the apparatus, an adjustable shutter adapted to vary the width of said slot, and means for packing the charge harder at the periphery of the pan than elsewhere.

In testimony whereof I have signed my name.

HELGE GUSTAF TORULF.